(12) United States Patent
Humphrey

(10) Patent No.: US 9,971,936 B2
(45) Date of Patent: May 15, 2018

(54) ADAPTIVE SIGNAL DETECTION AND SYNTHESIS ON TRACE DATA

(71) Applicant: Li-Cor, Inc., Lincoln, NE (US)

(72) Inventor: Patrick G. Humphrey, Lincoln, NE (US)

(73) Assignee: LI-COR, Inc., Lincoln, NE (US)

( * ) Notice: Subject to any disclaimer, the term of this patent is extended or adjusted under 35 U.S.C. 154(b) by 0 days. days.

(21) Appl. No.: 15/185,983

(22) Filed: Jun. 17, 2016

(65) Prior Publication Data

US 2017/0364731 A1   Dec. 21, 2017

(51) Int. Cl.
*G06K 9/00* (2006.01)

(52) U.S. Cl.
CPC ....... *G06K 9/0053* (2013.01); *G06K 9/00503* (2013.01)

(58) Field of Classification Search
CPC .......................... G06K 9/0053; G06K 9/00503
See application file for complete search history.

(56) References Cited

U.S. PATENT DOCUMENTS

| | | | |
|---|---|---|---|
| 5,832,119 A | 11/1998 | Rhoads | |
| 6,018,312 A | 1/2000 | Haworth | |
| 6,137,831 A * | 10/2000 | Johnson | H04L 27/0012 375/229 |
| 9,218,652 B2 | 12/2015 | Humphrey | |
| 9,384,538 B2 | 7/2016 | Humphrey | |
| 2004/0098208 A1 * | 5/2004 | Reeve | G01N 24/08 702/32 |
| 2006/0178849 A1 | 8/2006 | Maier et al. | |
| 2007/0064956 A1 * | 3/2007 | Iwata | G10L 21/038 381/61 |
| 2007/0150213 A1 | 6/2007 | Kim et al. | |
| 2008/0306694 A1 | 12/2008 | Izmailov et al. | |
| 2011/0267340 A1 | 11/2011 | Kraus et al. | |

OTHER PUBLICATIONS

International Search Report for Application No. PCT/US2017/037393 dated Aug. 25, 2017.

* cited by examiner

*Primary Examiner* — Kenny Cese
(74) *Attorney, Agent, or Firm* — Leydig, Voit & Mayer, LLP; Gerald T. Gray

(57) ABSTRACT

Systems and methods for detecting, decoupling and quantifying unresolved signals in trace signal data in the presence of noise with no prior knowledge of the signal characteristics (e.g., signal peak location, intensity and width) of the unresolved signals. The systems and methods are useful for analyzing any trace data signals having one or multiple overlapping constituent signals and particularly useful for analyzing data signals which often contain an unknown number of constituent signals with varying signal characteristics, such as peak location, peak intensity and peak width, and varying resolutions. A general signal model function is assumed for each unknown, constituent signal in the trace signal data. In a first phase, the number of constituent signals and signal characteristics are determined automatically in a parallel fashion by executing multiple simultaneous evaluations iteratively starting with an initial set of trial signals. Making simultaneous evaluations and systematically reducing the number of trial signals allows for convergence to an optimal, final set of signals in a very fast and efficient manner.

24 Claims, 19 Drawing Sheets

⋮

⋮

ADAPTIVE SIGNAL DETECTION AND SYNTHESIS ON TRACE DATA

FEDERALLY SPONSORED RESEARCH OR DEVELOPMENT

This invention was made with Government support under Grant Number 1R43GM112289-01 awarded by the Department of Health and Human Services. The Government has certain rights in this invention.

BACKGROUND

The present disclosure relates to the field of computing, and in particular to methods and apparatus for analyzing and/or filtering any data stream of trace data or image data to determine constituent signals and displaying the constituent signals of the data stream. Examples of data streams include data streams with data representing still images, video, and other one-dimensional, two-dimensional, three-dimensional, four-dimensional, and higher-dimensional data sets.

BRIEF SUMMARY

The present disclosure provides systems and methods for detecting, decoupling and quantifying unresolved signals in trace signal data in the presence of noise with no prior knowledge of the signal characteristics (e.g., signal peak location, intensity and width) of the unresolved signals other than the general expected shape of the signal(s) (e.g., generalized signal model function such as Gaussian or skewed Gaussian). The systems and methods are useful for analyzing any trace data signals having one or multiple overlapping constituent signals and particularly useful for analyzing electrophoresis data signals, chromatography data signals, spectroscopy data signals, and like data signals which often contain an unknown number of constituent signals with varying signal characteristics, such as peak location, peak intensity and peak width, and varying resolutions.

According to an embodiment, a processor-implemented method is provided for processing a trace signal to determine two or more overlapping signal components of the trace signal. The method typically includes receiving trace signal data, the trace signal data including a plurality N of data points and representing at least M signals overlapping within a bandwidth defining the trace data, wherein M is an integer greater than 1, and defining an initial set of signal components to be the number N of data points, wherein initial signal locations for each of the signal components of the initial set of signal components correspond to the locations within the bandwidth of the number N of data points. The method also typically includes a) simultaneously performing a numerical method signal extraction calculation on each signal component in the initial set of signal components, b) determining a signal amplitude value for each signal component of the initial set of signal components based on the extraction calculation, c) removing from the initial set of signal components, or attenuating, each signal component determined to have a negative signal amplitude value based on the extraction calculation to produce an adjusted set of signal components, and d) determining a final set of signal components by iteratively repeating steps a)-c) using the adjusted set of signal components as the initial set of signal components until no signal component has a negative amplitude value based on the extraction calculation. The method also typically includes outputting signal locations and signal intensities of the overlapping signal components based on the final set of signal components. The output signal locations and intensities may be displayed on a display and/or further processed to determine additional information.

In certain aspects, outputting signal locations and signal intensities of the overlapping signal components based on the final set of signal components includes identifying two or more amplitude groups in the final set of signal components, each amplitude group comprising signal components corresponding to one or more consecutive locations each having a non-zero, positive amplitude value, determining a signal location for each of the overlapping signals by calculating a centroid of the corresponding amplitude group, and determining a signal intensity for each of the overlapping signals by summing the amplitude values of the signal components within the corresponding amplitude group.

According to an embodiment, a processor-implemented method of processing a trace signal to determine one or more unknown signal components of the trace signal is provided. The method typically includes receiving trace signal data, the trace signal data including a plurality N of data points and representing at least M signals within a bandwidth defining the trace data, wherein M is an integer greater than or equal to 1, and defining an initial set of signal components to be the number N of data points, wherein initial signal locations for each of the signal components of the initial set of signal components correspond to the locations within the bandwidth of the number N of data points. The method also typically includes a) simultaneously performing a numerical method signal extraction calculation on each signal component in the initial set of signal components, b) determining a signal amplitude value for each signal component of the initial set of signal components based on the extraction calculation, c) removing from the initial set of signal components, or attenuating, each signal component determined to have a negative signal amplitude value based on the extraction calculation to produce an adjusted set of signal components, and d) determining a final set of signal components by iteratively repeating steps a)-c) using the adjusted set of signal components as the initial set of signal components until no signal component has a negative amplitude value based on the extraction calculation. The method further typically includes outputting signal locations and signal intensities of one or more signal components of the trace signal based on the final set of signal components. The output signal locations and intensities may be displayed on a display and/or further processed to determine additional information.

In certain aspects, outputting signal locations and signal intensities of the one or more signal components of the trace signal based on the final set of signal components includes identifying one or more amplitude groups in the final set of signal components, each amplitude group comprising signal components corresponding to one or more consecutive locations each having a non-zero, positive amplitude value, determining a signal location for each of the one or more signal components of the trace signal by calculating a centroid of the corresponding amplitude group, and determining a signal intensity for each of the one or more signal components of the trace signal by summing the amplitude values of the signal components within the corresponding amplitude group.

In certain aspects, all signal components in the trace data are assumed to have the same curve profile type when performing the numerical method signal extraction calculation, wherein the curve profile type is selected from the group consisting of a Gaussian profile, a bi-Gaussian profile, an exponentially modified Gaussian profile, a Haarhoff-van der Linde profile, a Lorentzian profile or a Voigt profile. In certain aspects, the numerical method extraction calculation includes a conjugate gradient method, a Generalized Minimum Residual method, a Newton's method, a Broyden's method or a Gaussian elimination method. In certain aspects, the numerical method signal extraction calculation is performed using a matrix formulation, wherein determining a signal amplitude value includes identifying indices of an amplitude matrix that have negative amplitudes, and wherein removing or attenuating includes updating a weighting matrix so that weight values of the corresponding identified indices in the weighting matrix are each multiplied by an attenuation factor, wherein the attenuation factor is less than 1 and greater than or equal to zero.

According to another embodiment, a computer readable medium storing code, which when executed by one or more processors cause the one or more processors to implement a method of processing a trace signal to determine one or more unknown signal components of the trace signal, the code including instructions to perform various steps as mentioned above, and herein below.

According to yet another embodiment, a processing device is provided that processes a trace signal to determine one or more unknown signal components of the trace signal. The device typically includes a processor, and a memory storing code executable by the processor, wherein the code includes instructions, which when executed by the processor, cause the processor to receive trace signal data, the trace signal data including a plurality N of data points and representing at least M signals overlapping within a bandwidth defining the trace data, wherein M is an integer greater than or equal to 1, and define an initial set of signal components to be the number N of data points, wherein initial signal locations for each of the signal components of the initial set of signal components correspond to the locations within the bandwidth of the number N of data points. The code further typically includes instructions, which when executed by the processor, cause the processor to a) simultaneously perform a numerical method signal extraction calculation on each signal component in the initial set of signal components, b) determine a signal amplitude value for each signal component of the initial set of signal components based on the extraction calculation, c) remove from the initial set of signal components, or attenuating, each signal component determined to have a negative signal amplitude value based on the extraction calculation to produce an adjusted set of signal components, and determine a final set of signal components by iteratively repeating a)-c) using the adjusted set of signal components as the initial set of signal components until no signal component has a negative amplitude value based on the extraction calculation. The code also typically includes instructions, which when executed by the processor, cause the processor to output signal locations and signal intensities of one or more signal components of the trace signal based on the final set of signal components.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

The detailed description is described with reference to the accompanying figures. The use of the same reference numbers in different instances in the description and the figures may indicate similar or identical items.

Figure 7:
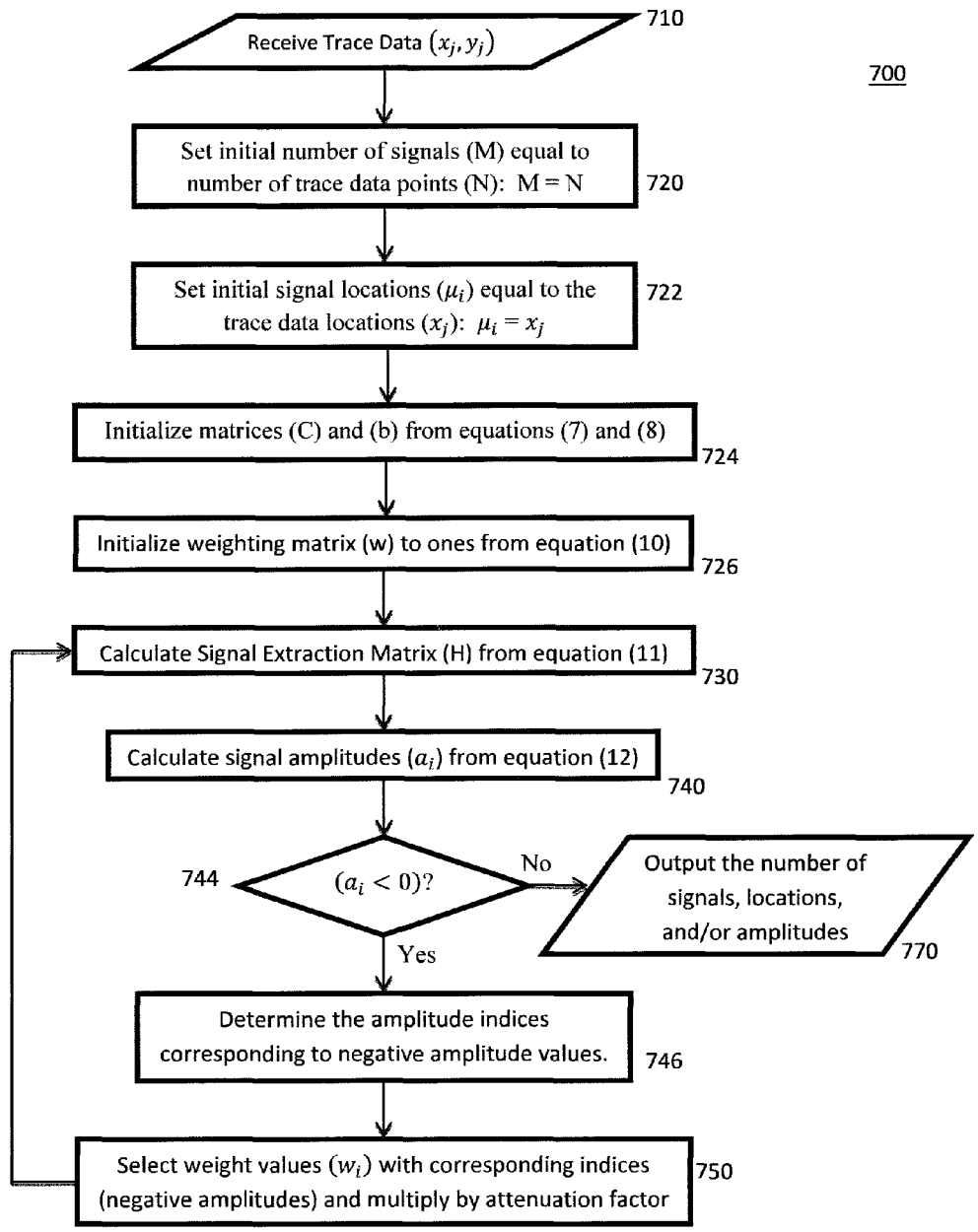
FIG. 7 is a flow diagram of a matrix formulation of a signal detection and synthesis method (phase I) according to an embodiment.

FIG. 8 illustrates examples of processing a trace signal without noise according to the method of FIG. 7: FIG. 8A shows the original trace signal data; FIG. 8B shows the reduced set of trial signals after two processing iterations; FIG. 8C shows the reduced set of trial signals after eight processing iterations; FIG. 8D shows the reduced set of trial signals after N processing iterations; FIG. 8E shows a visual representation of the three constituent signals and their determined characteristics and a visualization of the sum of the three constituent signals, which matches the original trace signal data shown in FIG. 8A.

FIG. 9 illustrates examples of processing a trace signal with noise according to the method of FIG. 7: FIG. 9A shows the original trace signal data; FIG. 9B shows the reduced set of trial signals after two processing iterations; FIG. 9C shows the reduced set of trial signals after eight processing iterations; FIG. 9D shows the reduced set of trial signals after N processing iterations; FIG. 9E shows a visual representation of the three constituent signals and their determined characteristics and a visualization of the sum of the three constituent signals, which substantially matches the original trace signal data shown in FIG. 9A.

Figure 10:
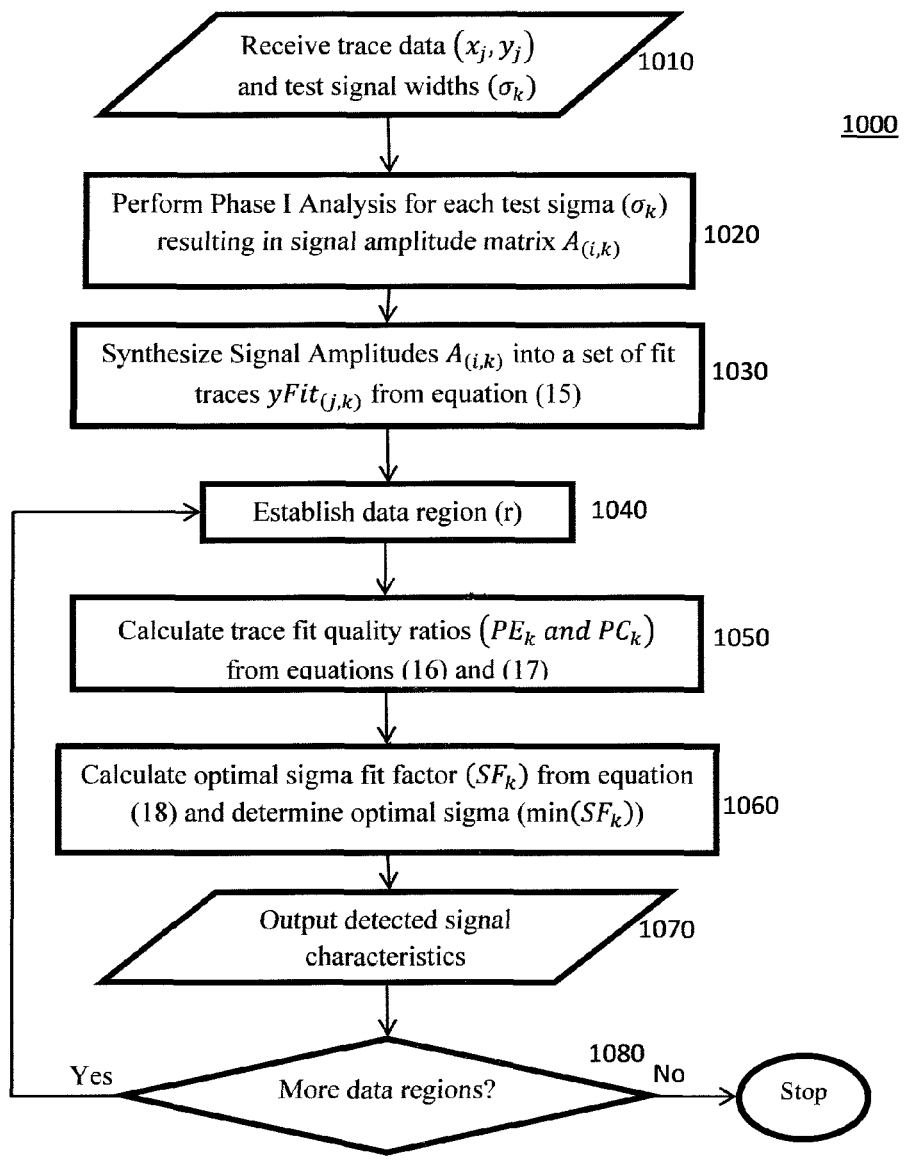

FIG. 10 is a flow diagram of a matrix formulation of a signal width (sigma) determination method (phase II) according to an embodiment.

Figure 11A:
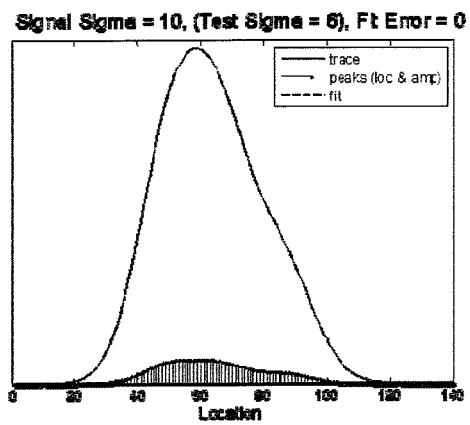
Figure 11B:
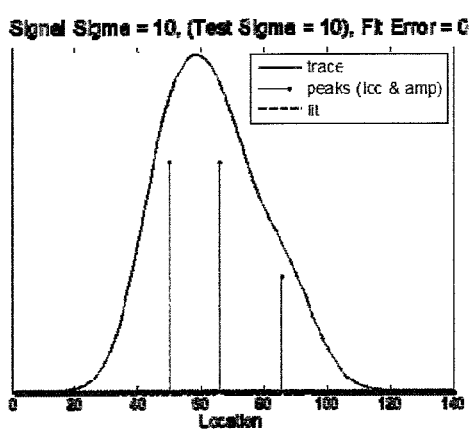
Figure 11C:
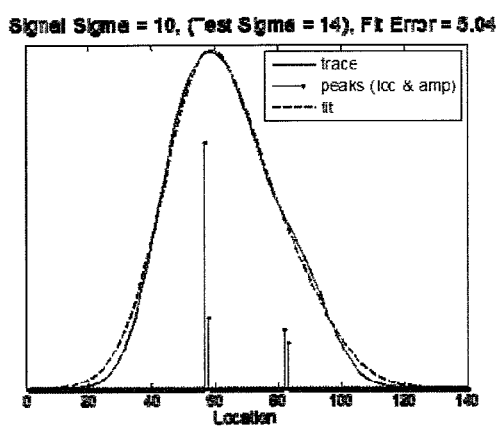

FIG. 11 illustrates example phase II results for trace signal data without noise, where the true signal width (sigma) is 10: FIG. 11A shows results for a test sigma of 6 with a fit error of 0; FIG. 11B shows results for a test sigma of 10 a fit error of 0; and FIG. 11C shows results for a test sigma of 14 a fit error of 5.04.

Figure 12:
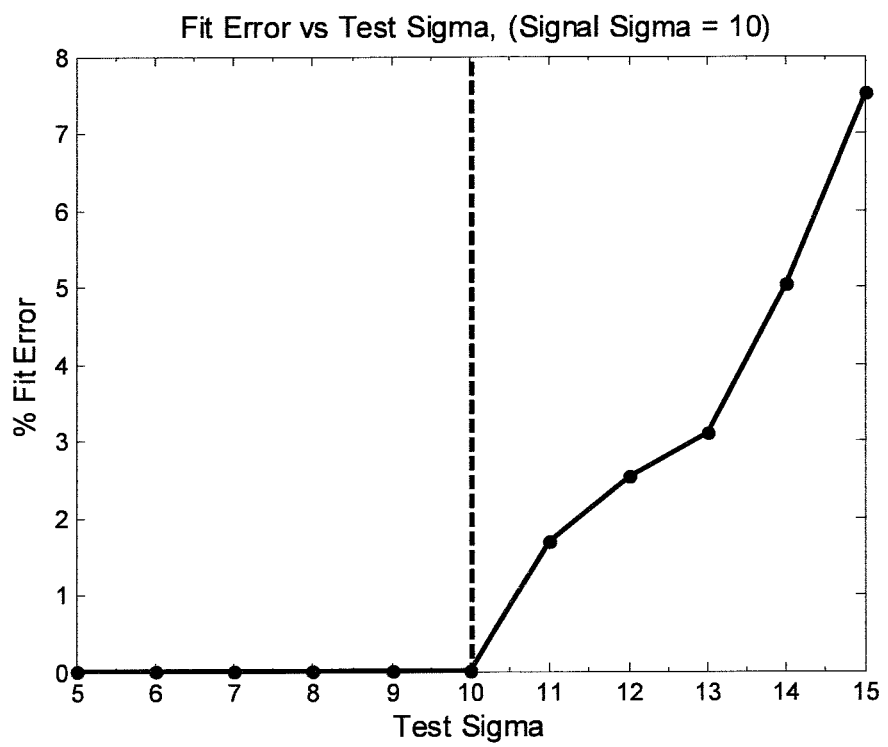

FIG. 12 illustrates a graph of fit error (or $PE_k$) v. test sigma.

Figure 13:
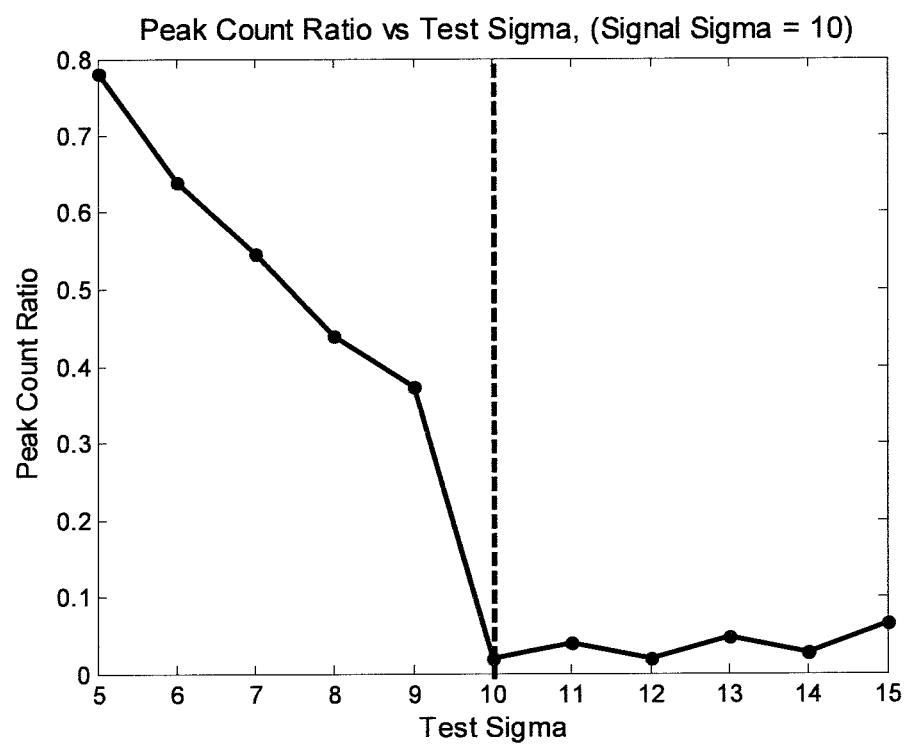

FIG. 13 illustrates a graph of peak count ratio (or $PC_k$) v. test sigma.

Figure 14:
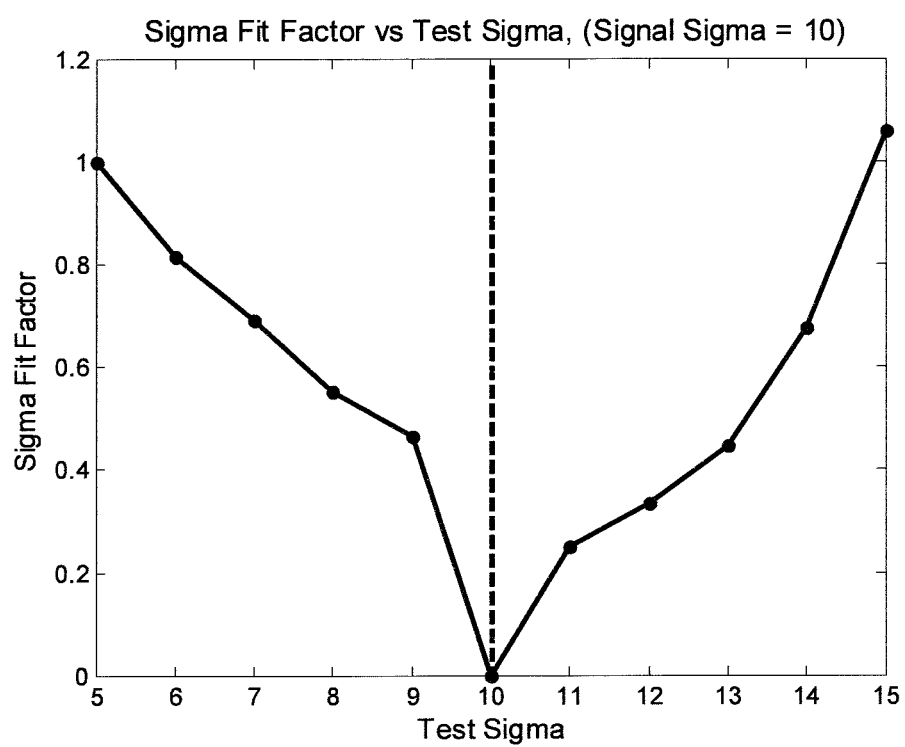

FIG. 14 illustrates a graph of calculated sigma fit factor (or $SF_k$) v. test sigma.

Figure 15A:
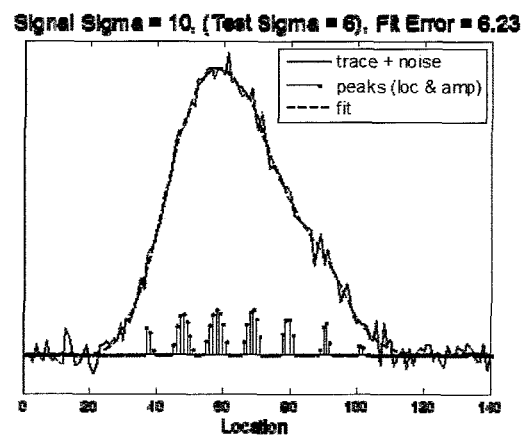
Figure 15B:
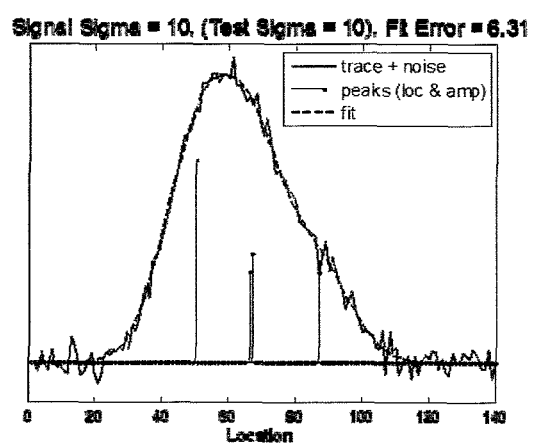
Figure 15C:
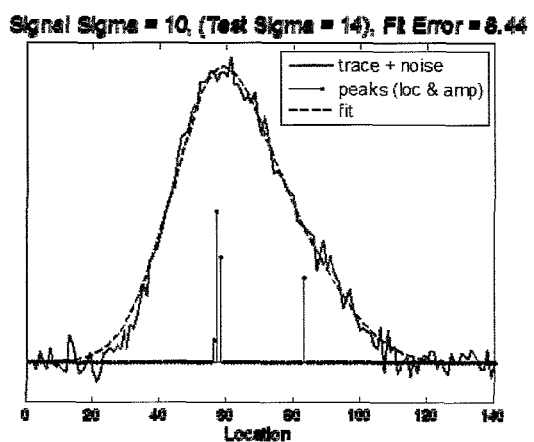

FIG. 15 illustrates example phase II results for trace signal data in the presence of noise, where the true signal width (sigma) is 10: FIG. 15A shows results for a test sigma of 6 with a fit error of 6.23; FIG. 15B shows results for a test sigma of 10 a fit error of 6.31; and FIG. 15C shows results for a test sigma of 14 a fit error of 8.44.

Figure 16:
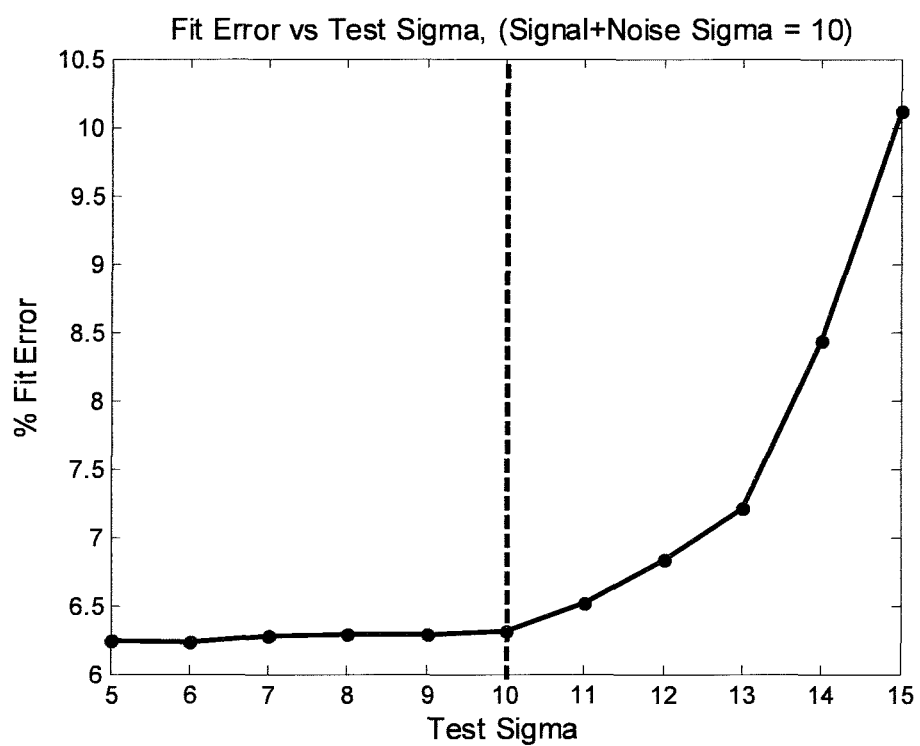

FIG. 16 illustrates a graph of fit error (or $PE_k$) v. test sigma.

Figure 17:
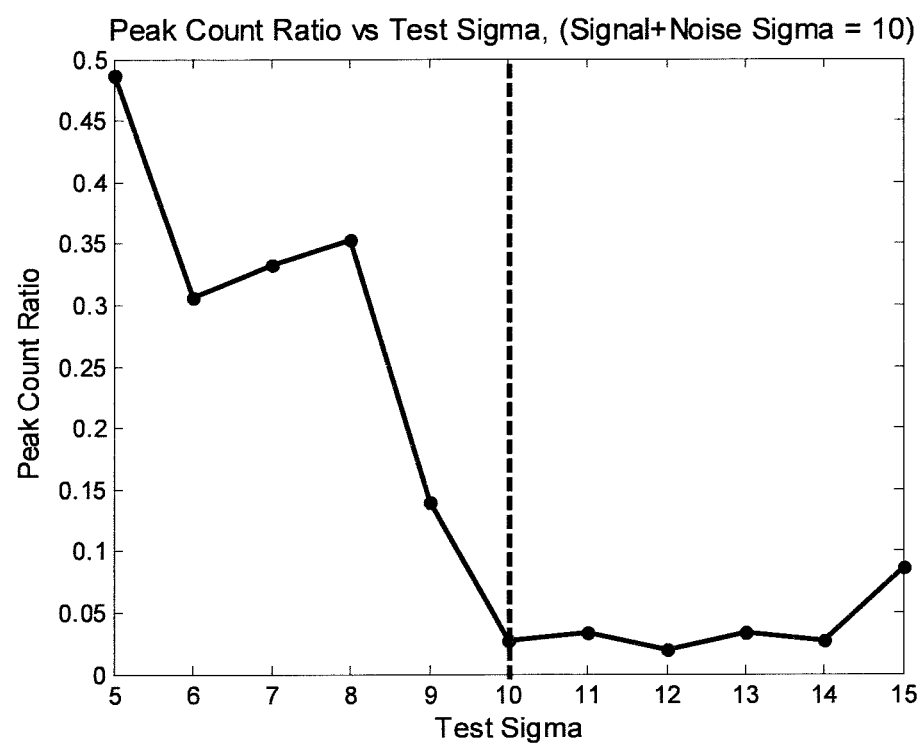

FIG. 17 illustrates a graph of peak count ratio (or $PC_k$) v. test sigma.

Figure 18:
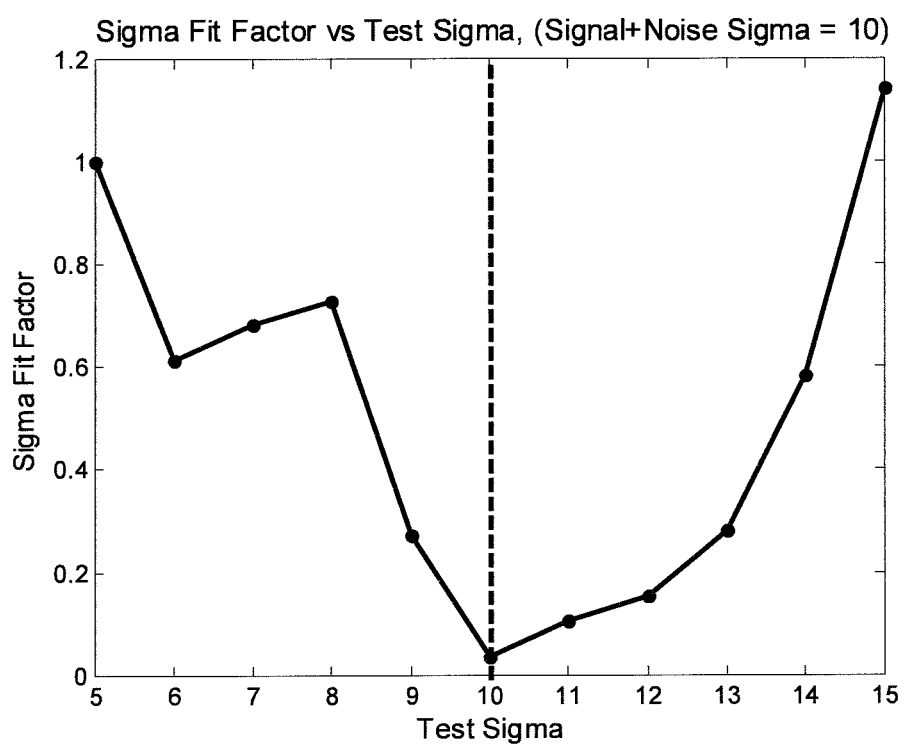

FIG. 18 illustrates a graph of calculated sigma fit factor (or $SF_k$) v. test sigma.

Figure 19:
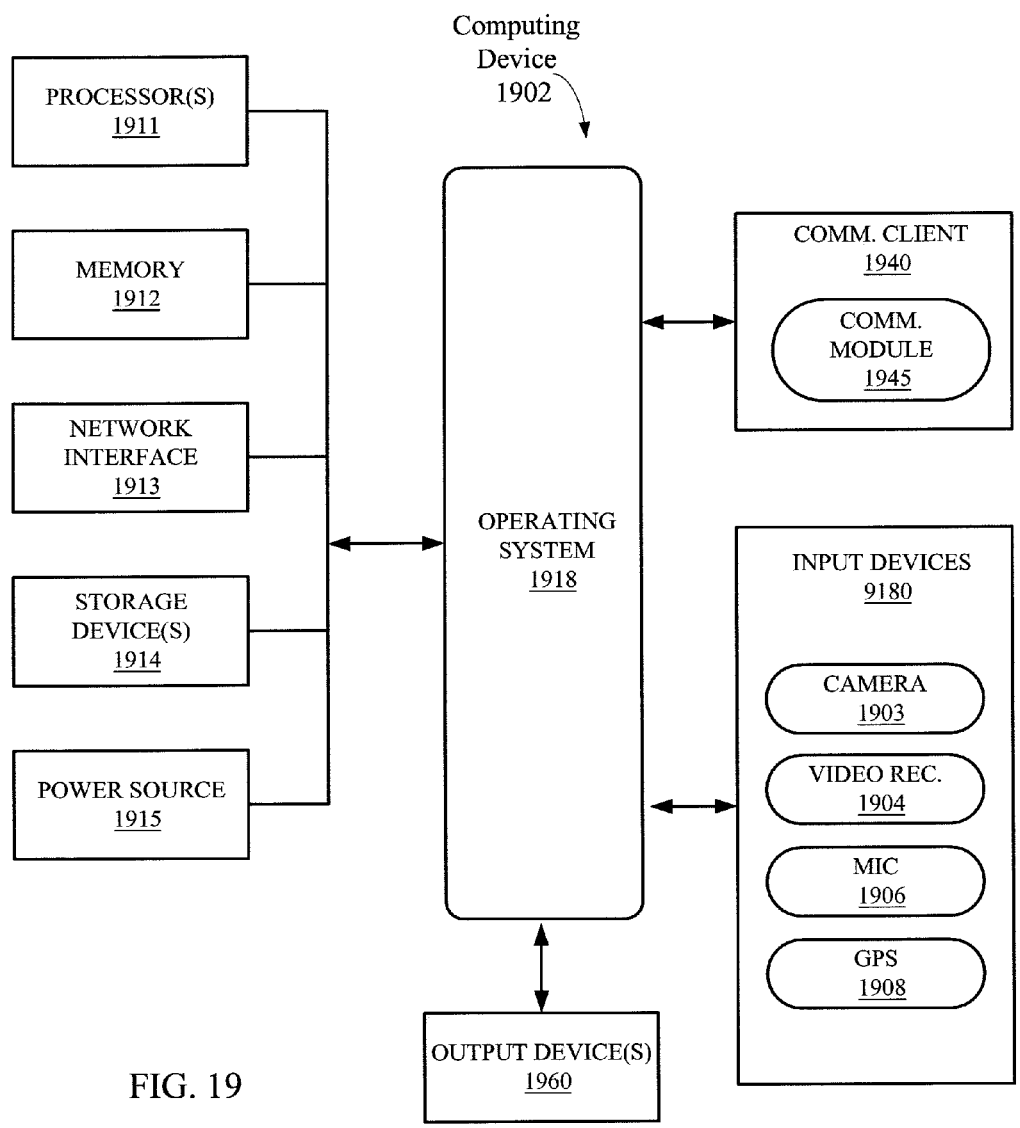

FIG. 19 is a block diagram of example functional components for a computing system or device configured to perform one or more of the analysis techniques described herein, according to an embodiment.

DETAILED DESCRIPTION

According to various embodiments, techniques for detecting, decoupling and quantifying unresolved constituent signals in trace signal data are automatic and do not require manual user input or configuration. For example, the techniques do not require a priori knowledge of the number of signals or characteristics of the signals, whether overlapping or not, but rather, independently determine underlying data characteristics of the unknown constituent signals on a de novo basis.

The methods are useful for analyzing any data signal having one or multiple constituent signals, and particularly for analyzing electrophoresis data signals, chromatography data signals, spectroscopy data signals, and like signals that often contain an unknown number of signals, often overlapping in frequency, with varying signal characteristics, such as peak location, peak intensity and peak width, and varying resolutions. As one particular example, application of the techniques of the present embodiments to Western blot analysis data enables enhanced measurement of protein expression by providing improved quantitation, throughput, content and reproducibility.

A general signal model function (e.g., Gaussian, Lorentzian, Voigt, etc) is assumed for each unknown, constituent signal in the trace signal data. In a first phase, the number of constituent signals and signal characteristics are determined automatically in a parallel fashion by executing multiple simultaneous evaluations iteratively starting with an initial set of trial signals. For example, the initial trial set of possible signals may include all data points, or a subset of all data points, in the trace data. During the first iteration, each trial signal in the set of trial signals (peak locations, intensities, widths) is evaluated simultaneously and the set is systematically reduced to a reduced set of signals. During each iteration thereafter, each signal in the reduced set of signals (peak locations, intensities, widths) is evaluated simultaneously and the set is systematically reduced. Making simultaneous evaluations and systematically reducing the number of trial signals allows for convergence to an optimal, final set of signals in a very fast and efficient manner. In certain aspects, the initial trial signals are assumed to have a specified width, and in a second phase of the methodology of the present disclosure, a width determination process determines an optimal width of the determined constituent signals of the trace signal data. The systematic signal reduction methodology and signal width determination is advantageously resistant to overfitting of data.

Figure 1:
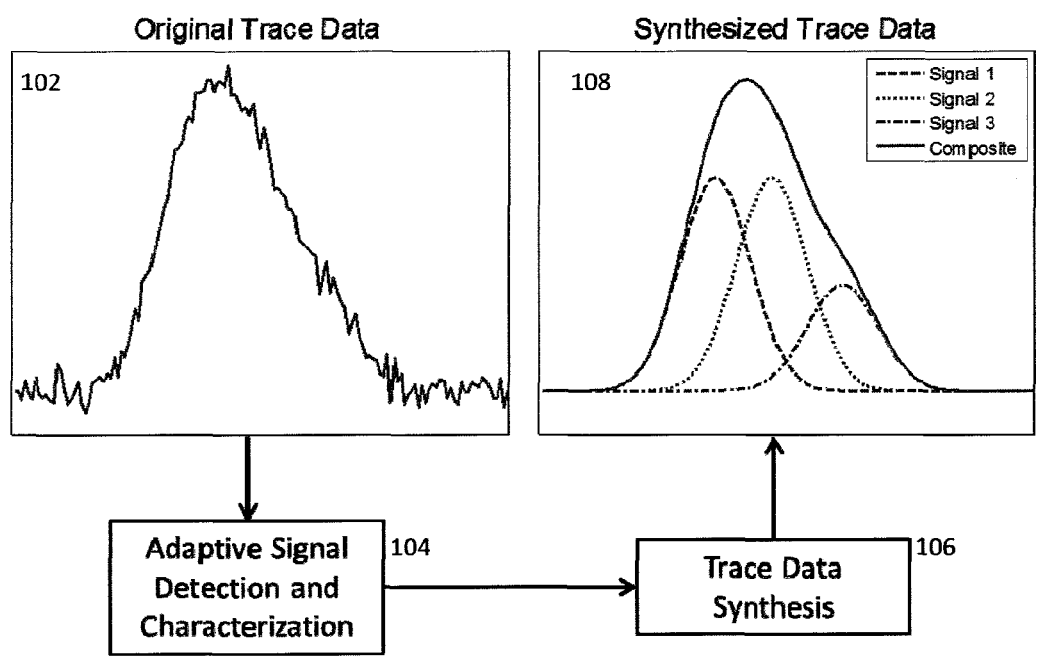
FIG. 1 is a block diagram of an example system for determining constituent signals in trace signal data, according to an embodiment.

FIG. 1 is a block diagram of an example system for determining constituent signals in trace signal data, according to an embodiment. As shown, trace signal data 102 is received. The trace signal data 102 may be input or received from any data generating device and typically includes data representing one or more overlapping signals. Examples of data generating devices include spectroscopic imaging devices (e.g., for analyzing trace gases) or chromatography (liquid or gas) imaging devices or electrophoresis imaging devices or other devices that generate trace signal data including multiple overlapping (in frequency) data signals. In general, the embodiments of the present invention are useful for determining and separating properties characterized by, or embodied as, signals. An example might include signals representing automobile or pedestrian traffic flow or traffic flow rates.

The trace signal data 102 is received by a signal detection and characterization engine 104. As described in greater detail herein, the signal detection and characterization engine 104 analyzes the trace signal data 102 to determine and quantify the constituent signals present in the trace signal data. Determined information such as the number of constituent signals present and signal characteristics such as peak location, peak amplitude or intensity, and peak width are provided to trace data synthesis engine 106. Trace data synthesis engine 106 processes the signal characteristics to provide an output such as providing data characterizing the constituent signals and/or rendering an output image 108 which represents a visual representation of the trace data signal and its constituent signals. As shown in FIG. 1, for example trace signal data 102 is determined by the signal detection and characterization engine 104 to have three (3) constituent signals, and trace data synthesis engine 106 renders a display showing the three constituent signals and the composite signal, which represents the signal content of the trace signal data 102. For example, the three constituent signals may represent constituent compounds in electrophoresis trace data, chromatographic trace data, or spectrographic trace data. According to various embodiments, each of the signal detection and characterization engine 104 and/or the trace data synthesis engine 106 can be implemented in hardware, software, and/or a combination of hardware and software. Further, signal detection and characterization engine 104 and trace data synthesis engine 106 may be implemented in the same processing device or in different processing devices.

Figure 2:
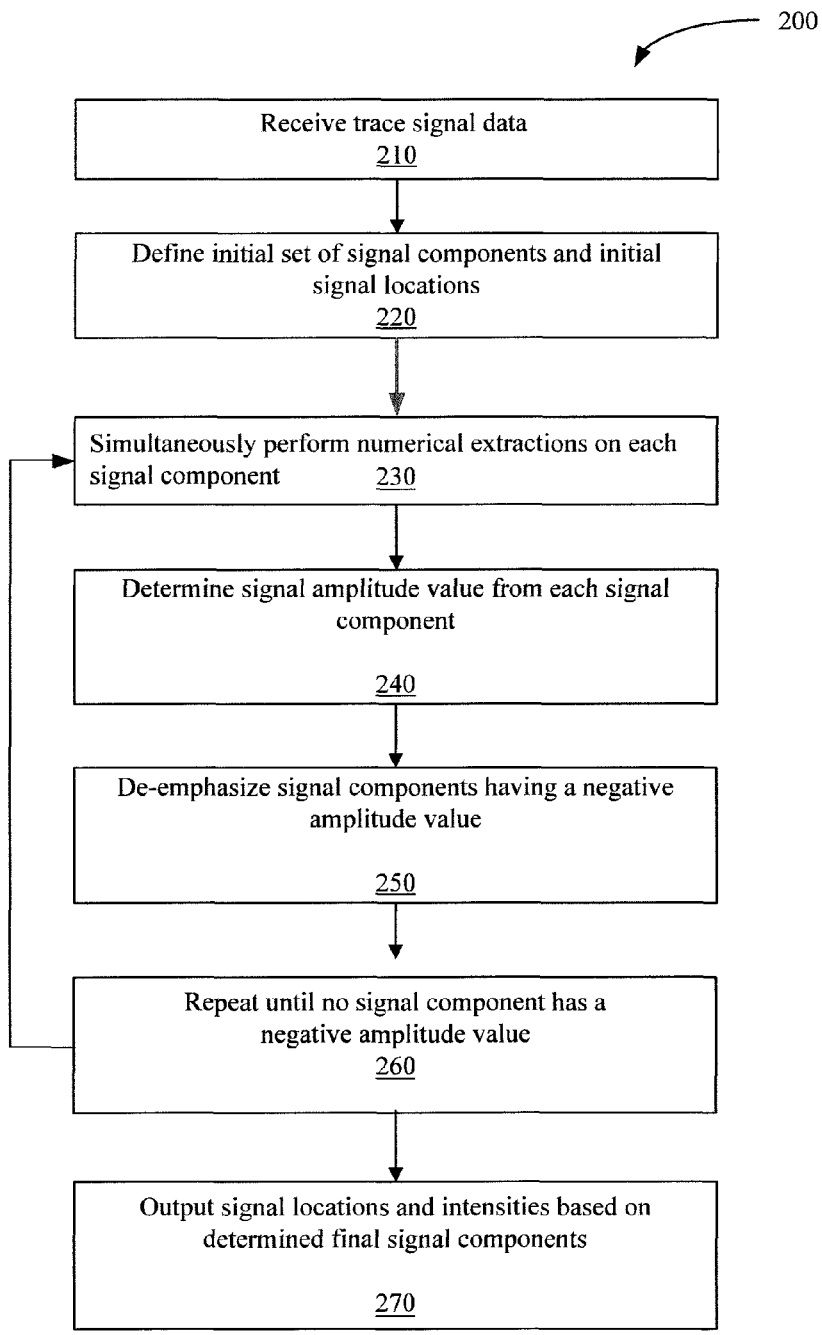
FIG. 2 is a flow diagram for a method (phase I) of determining the number, location, and intensity (i.e., amplitude) of constituent signals present in trace signal data according to an embodiment.

FIG. 2 is a flow diagram for a method 200 (phase I) of determining the number, location, and intensity (i.e., amplitude) of constituent signals present in trace signal data according to an embodiment. The unknown, constituent signals of the trace data are each assumed to have the same signal profile (e.g., Gaussian, Lorentzian, etc.) for a specified signal width (or test sigma (a)). For example, the optimal signal profile and test width (e.g., test sigma) may be determined automatically based on characteristics of the device or system that generated the trace signal data, or set by a user (e.g., by inputting a signal profile type or selecting from a list of possible signal profile types). Advantageously, the present embodiments do not require a priori knowledge of the number of actual constituent signals in the trace signal data or the characteristics of the constituent signals.

The method 200 begins at step 210 by signal detection and characterization engine 104 receiving or acquiring the trace signal data 102 to be processed. The trace signal data 102 typically includes a plurality N of data points and represents at least M (unknown, constituent) signal components within the bandwidth defined by the trace data, wherein M is an integer greater than or equal to 1. At step 220 an initial set of signal components (possible constituent signals) is automatically defined based on the trace signal data. For example, an initial set of signal components M for processing is defined as the number N of trace data points in the original data trace where initial signal (peak) locations for each of the signal components of the initial set of signal components correspond to the locations of the number N of data points of the trace signal data. For example, the initial trial signal peak locations are set to be equal to the input data point locations.

Next, the signal amplitude values for all locations are simultaneously calculated to best match the trace signal data. The signals with invalid (e.g., negative) amplitudes are de-emphasized or attenuated to produce an adjusted signal set. For example, in step 230 a numerical method signal extraction calculation is simultaneously performed on each signal component in the initial set of signal components, and at step 240, a signal amplitude value is determined for each signal component of the initial set of signal components based on the extraction calculation. The numerical method extraction calculation may include a conjugate gradient method, a Generalized Minimum Residual method, a Newton's method, a Broyden's method, a Gaussian elimination method or similar method as would be apparent to one skilled in the art. Also, as above, all signal components in the trace data are assumed to have the same curve profile type when performing the numerical method signal extraction calculation. Examples of curve profile types include a Gaussian profile, a bi-Gaussian profile, an exponentially modified Gaussian profile, a Haarhoff-van der Linde profile, a Lorentzian profile and a Voigt profile.

In step 250, each signal component determined to have a negative signal amplitude value based on the extraction calculation is de-emphasized (e.g., attenuated, or removed) to produce an adjusted set of signal components. The method then recalculates the signal amplitude values with the adjusted signal set. The method continues to systematically adjust (de-emphasize) signals until there are no negative signal amplitudes present, resulting in a final set of signal components (number, locations, and amplitudes) with positive amplitudes that match the signal content of the input trace. For example, in step 260 a final set of signal components is determined by iteratively repeating steps 230, 240 and 250 using, at each iteration, the adjusted set of signal components from the previous iteration as the initial set of signal components until no signal component has a negative amplitude value based on the extraction calculation of step 230. In step 270, information about the final set of signals is output. For example, trace data synthesis engine 106 may output signal peak locations and signal peak intensities of one or more (previously unknown) signal components of the trace signal based on the final set of signal components and/or the trace data synthesis engine 106 may render a visual representation of the overlapping signal components and/or a composite signal representing a combination of the signal components with or without a visual representation of the original trace signal data.

In one embodiment, outputting signal locations and signal intensities of the one or more (previously unknown) signal components of the trace signal data based on the final set of signal components includes identifying one or more amplitude groups in the final set of signal components, where each amplitude group represents a constituent (previously unknown or unresolved) signal component of the trace signal data. In one embodiment, each amplitude group is defined as including final signal components corresponding to one or more consecutive locations each having a non-zero, positive amplitude value. For each amplitude group identified, and hence for each constituent signal of the trace signal data, a signal peak location is determined by calculating a centroid of the corresponding amplitude group. Similarly, for each amplitude group identified, and hence for each constituent signal of the trace signal data, a signal intensity is determined by summing the amplitude values of the final signal components within the corresponding amplitude group.

Figure 3:
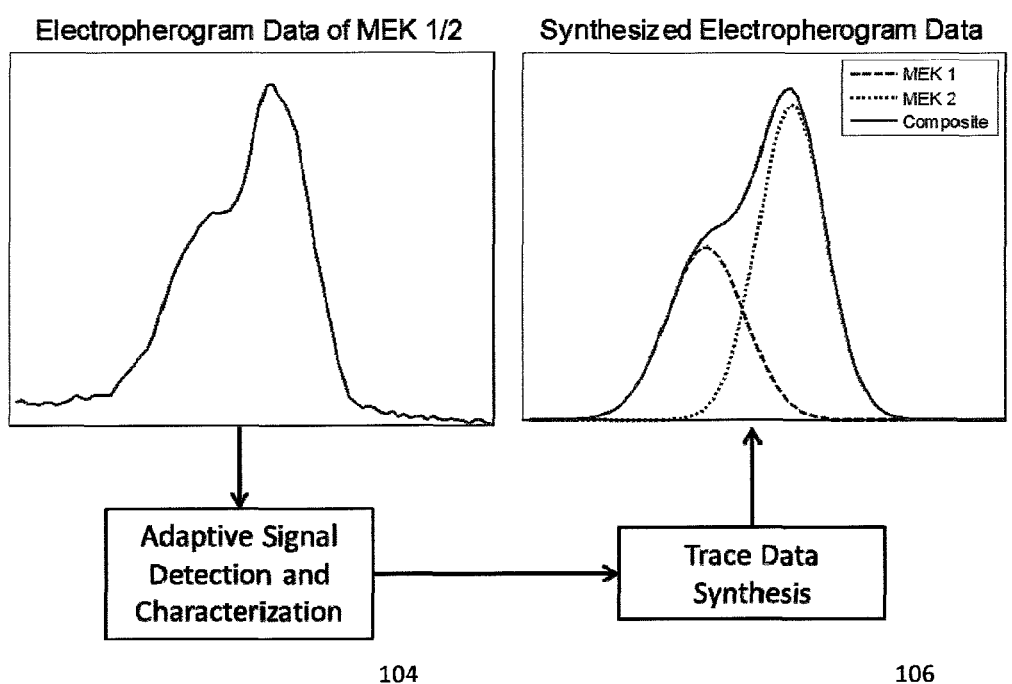
FIG. 3 illustrates an example visual representation of two determined constituent signals MEK 1 and MEK 2 of Electropherogram trace data of MEK 1/2 displayed with a composite signal (combination of MEK1 and MEK2) according to an embodiment.
Figure 4:
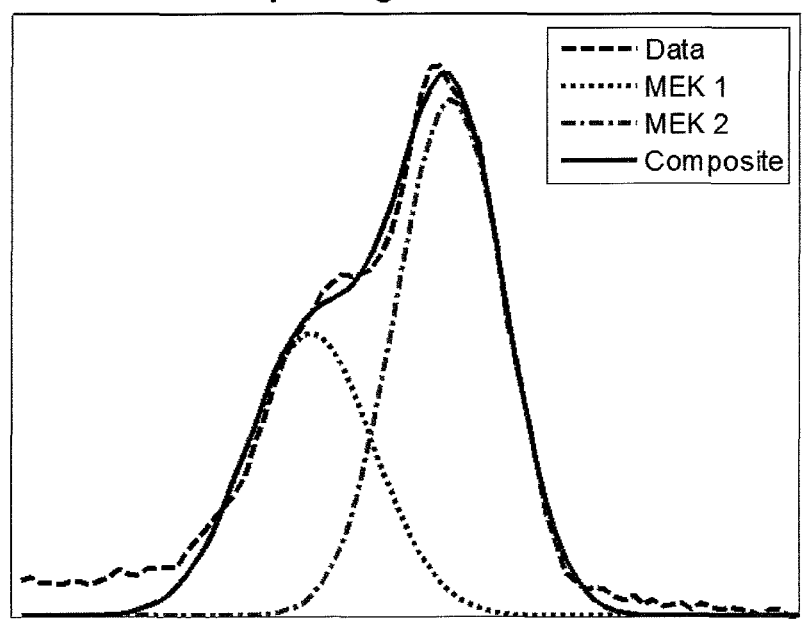
FIG. 4 shows a visual representation of the two constituent signals MEK 1 and MEK 2 displayed with the composite signal and the trace data signal according to an embodiment.
Figure 5:
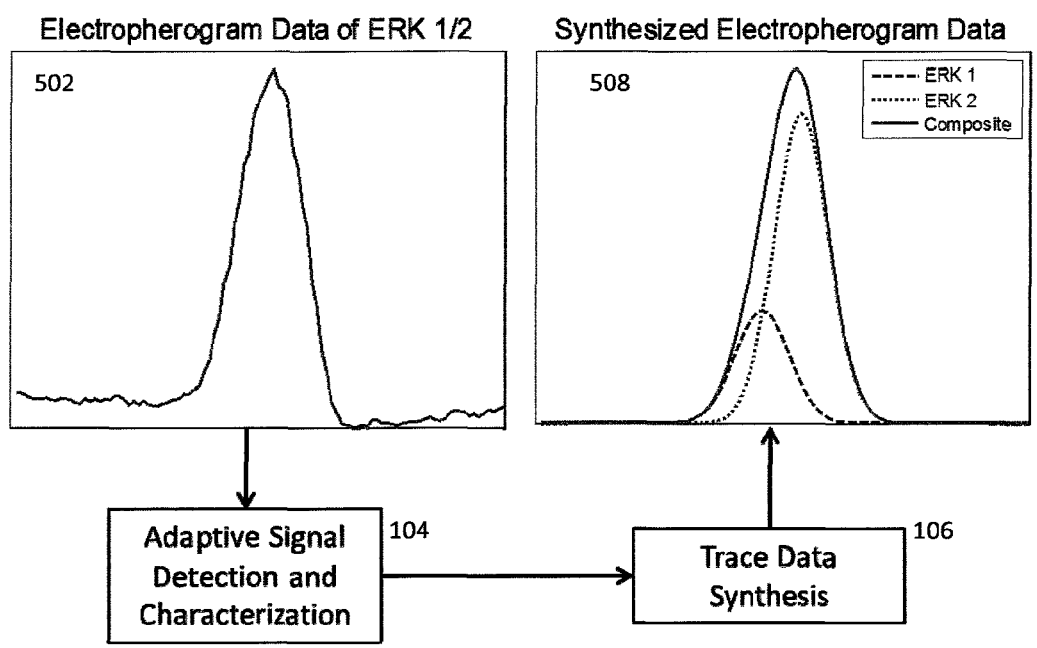
FIG. 5 illustrates an example visual representation of two determined constituent signals ERK 1 and ERK 2 of Electropherogram trace data of ERK 1/2 displayed with a composite signal (combination of ERK1 and ERK2) according to an embodiment.
Figure 6:
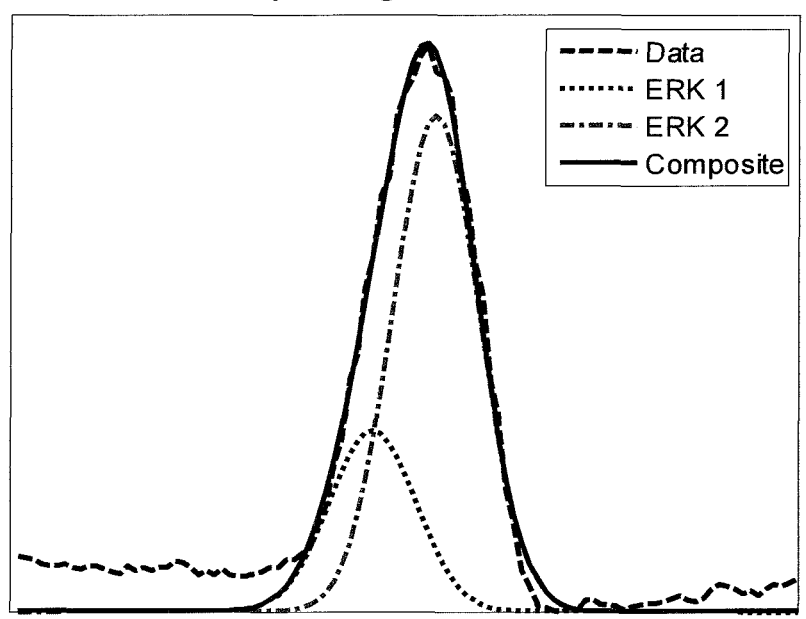
FIG. 6 shows a visual representation of the two constituent signals ERK 1 and ERK 2 displayed with the composite signal and the trace data signal.

FIGS. 3-6 illustrate examples of received trace signal data representing Electropherogram Data of MEK 1/2 (mitogen-activated protein kinases) and Electropherogram Data of ERK 1/2 (extracellular signal-regulated kinases) and visual representations of constituent signals as determined according to the methodology of FIG. 2. FIG. 3 illustrates an example of Electropherogram trace data 302 of MEK 1/2 received and processed by signal detection and characterization engine 104 and a visual representation of two determined constituent signals MEK 1 and MEK 2 displayed with a composite signal (combination of MEK1 and MEK2). FIG. 4 shows a visual representation of the two constituent signals MEK 1 and MEK 2 displayed with the composite signal and the trace signal data 302. As shown, the composite signal substantially matches the trace data signal 302, indicating robustness of the method at accurately detecting and characterizing poorly resolved signals in the presence of noise. FIG. 5 illustrates an example of Electropherogram trace data 502 of ERK 1/2 received and processed by signal detection and characterization engine 104 and a visual representation of two determined constituent signals ERK 1 and ERK 2 displayed with a composite signal (combination of ERK1 and ERK2). FIG. 6 shows a visual representation of the two constituent signals ERK 1 and ERK 2 displayed with the composite signal and the trace data signal 502. As shown, the composite signal substantially matches the trace data signal 502, indicating robustness of the method at accurately detecting and characterizing poorly resolved signals in the presence of noise.

A specific example of a methodology for phase I, implemented in a matrix formulation, for determining one or more unknown signal components of trace signal data will now be described with reference to FIG. 7. FIG. 7 is a flow diagram of a matrix formulation of a signal detection and synthesis method 700 according to an embodiment. In the embodiment shown in FIG. 7, the constituent signals of the received trace signal data are assumed to have a Gaussian profile and a specified width (test sigma), and the method 700 determines characteristics (e.g., number of signals, location of peaks and amplitudes of peaks) of the constituent signals of the trace signal data.

Figure 8A:
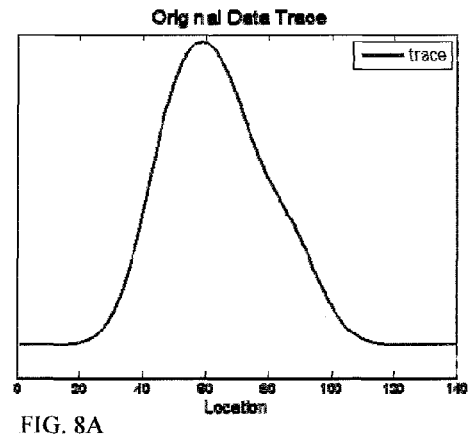

In step 710 the trace signal data is received. The trace signal data includes a plurality N of data points defined by x and y coordinates (i.e., the bandwidth of the trace signal data is defined by the x-dimension, or range, which may for example be frequency for spectrographic derived data, and the amplitudes are define by the y-dimension). FIG. 8A illustrates a visual representation of trace signal data displayed in a two dimensional x-y graph. As shown in the example of FIG. 8A, the trace signal data has a range of 140 (x=1 to x=140), and for purposes of description will be assumed to include 140 (N) data points. The exemplary Gaussian model may be specified as:

Gaussian Model: $G_{(i,j)} = a_i E_{(i,j)}$ (1)

$$E_{(i,j)} = e^{\frac{-[(x_j - \mu_i)/\sigma]^2}{2}} \quad (2)$$

Where $x_j$=trace data point locations
$y_j$=trace data point intensity values
$\mu_i$=signal peak (mean) locations
$\sigma$=signal width (sigma)
$a_i$=signal peak amplitudes
i=1 to M (number of constituent signals)
  where M≥1
j=1 to N (number of data points)

In step 720, the initial number of trial signals are set equal to the number of data points (M=N) or 140 data points in the example of FIG. 8. In step 722, the initial trial signal peak locations ($\mu_i$) are set equal to the input data point locations ($x_j$):($\mu_i = x_j$), and matrix definitions are established or created in one embodiment as follows:

Establish an error squared equal to:

$$Err = \sum_{j=1}^{N} \left( y_j - \sum_{i=1}^{N} a_i E_{(i,j)} \right)^2 \quad (3)$$

and perform a least squares (or other regressive fitting analysis) process which includes differentiation of the error squared (equation (3)) with respect to each of the amplitudes ($a_i$) and setting it equal to zero.

$$\left. \begin{array}{c} \frac{\partial}{\partial a_1}(Err) = \sum_{j=1}^{N} \left( 2 \left( y_j - \sum_{i=1}^{N} a_i E_{(i,j)} \right) E_{(1,j)} \right) = 0 \\ \vdots \qquad \vdots \qquad \vdots \\ \frac{\partial}{\partial a_N}(Err) = \sum_{j=1}^{N} \left( 2 \left( y_j - \sum_{i=1}^{N} a_i E_{(i,j)} \right) E_{(N,j)} \right) = 0 \end{array} \right\} \quad (4)$$

Rewrite equation (4) as:

$$\left. \begin{array}{c} a_1 \sum_{j=1}^{N} (E_{(1,j)} E_{(1,j)}) + \ldots + a_N \sum_{j=1}^{N} (E_{(N,j)} E_{(1,j)}) = \sum_{j=1}^{N} (y_j E_{(1,j)}) \\ \vdots \qquad \vdots \qquad \vdots \\ a_1 \sum_{j=1}^{N} (E_{(1,j)} E_{(N,j)}) + \ldots + a_N \sum_{j=1}^{N} (E_{(N,j)} E_{(N,j)}) = \sum_{j=1}^{N} (y_j E_{(N,j)}) \end{array} \right\} \quad (5)$$

In step 724 matrices a, C and b are initialized as follows:

$$a = \begin{bmatrix} a_1 \\ \vdots \\ a_N \end{bmatrix} \quad (6)$$

$$C = \begin{bmatrix} \sum_{j=1}^{N} (E_{(1,j)} E_{(1,j)}) & \cdots & \sum_{j=1}^{N} (E_{(N,j)} E_{(1,j)}) \\ \vdots & \ddots & \vdots \\ \sum_{j=1}^{N} (E_{(1,j)} E_{(N,j)}) & \cdots & \sum_{j=1}^{N} (E_{(N,j)} E_{(N,j)}) \end{bmatrix} \quad (7)$$

$$b = \begin{bmatrix} \sum_{j=1}^{N} (y_j E_{(1,j)}) \\ \vdots \\ \sum_{j=1}^{N} (y_j (E_{(N,j)})) \end{bmatrix} \quad (8)$$

so that equation (5) can be written as:

$Ca = b$ (9)

In step 726 a weighting matrix w is defined and initialized as:

$$w = \begin{bmatrix} w_1 \\ \vdots \\ w_M \end{bmatrix} \quad (10)$$

Weighting matrix w advantageously allows for selectively and iteratively weighting the significance of each signal. Each weighting w has a value between 0 and 1, inclusive, where a weighting of 0 would represent complete removal, and a weighting of 1 would represent no reduction or de-emphasis. In certain aspects, the weightings can vary with each iteration and weightings can vary consistently across all indices, (all weightings change by the same amount) or differently across all indices, (e.g., one or more particular weightings may change by different values at each iteration). In the first iteration, the weightings should all be set to 1 (but they need not be).

In step 730 a Signal Extraction Matrix (H) is calculated by defining:

$H = Iw$ (11)

$I$=M by M identiy matrix and updating equation (9) with Signal Extraction Matrix as follows:

$[HCH]a = Hb$ (12)

In step 740, the amplitudes ($a_i$) are solved for in equation (12) utilizing a numerical method such as conjugate gradient process or other useful method. Other useful numerical methods include a Generalized Minimum Residual method, a Newton's method, a Broyden's method, a Gaussian elimination method and the like. At decision step 744, if any of the determined amplitudes are negative, the amplitude indices corresponding to the negative amplitudes are established or identified at step 746. In step 750, the weight values ($w_i$) with the corresponding indices (negative amplitudes) are multiplied by an attenuation factor (0≤attenFactor<1). The Signal Extraction Matrix (H) is then recalculated with the updated weighting matrix (w) in step 730. The amplitudes are then recalculated in step 740 utilizing equation (12) with the updated matrices. If any of the recalculated amplitudes are negative, the process (update (w) and (H) matrices and recalculate amplitudes) is repeated until each and every one of the calculated amplitudes are greater than or equal to zero. In this manner, the initial number of potential (trial) signals (N) has been systematically reduced to a final number of potential signals, e.g., the number of amplitudes ($a_i$) that are non-zero and positive. If, at decision step 744, all remaining amplitude values are non-negative (greater than or equal to zero), the method proceeds to step 770, where relevant information regarding the final signals are processed or output. For example, the number of constituent signals, peak locations and/or amplitudes or intensities of the constituent signals may be output at step 770.

In one embodiment, for example, the final, constituent signals are determined by detecting amplitude groups, where a group is defined as one or more consecutive (no gaps) non-zero positive amplitudes ($a_i$). In one embodiment, the signal locations of the constituent signals are the calculated centroids of each amplitude group, and the intensity of each constituent signal is equal to the summation of the amplitudes within each respective amplitude group.

FIGS. 8 and 9 illustrate examples of processing a trace signal according to method 700 according to embodiments. In FIG. 8, the trace signal data includes no noise, whereas in FIG. 9, the trace signal data is noisy/includes noise.

Figure 8B:
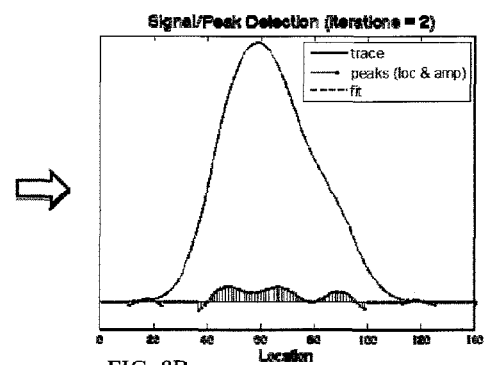
Figure 8C:
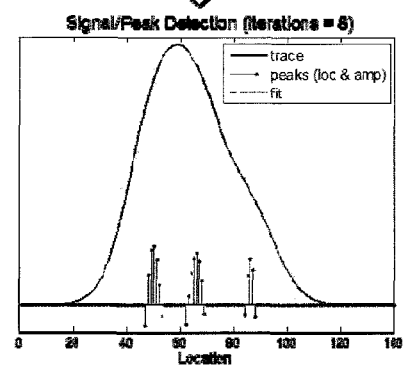
Figure 8D:
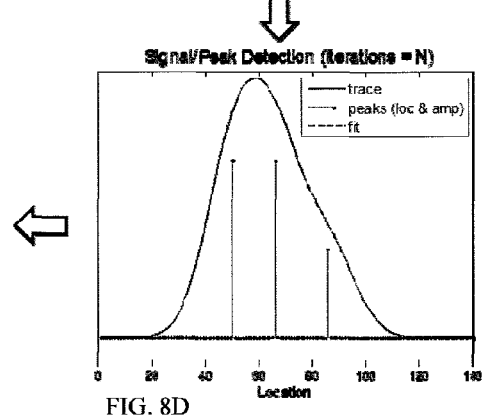
Figure 8E:
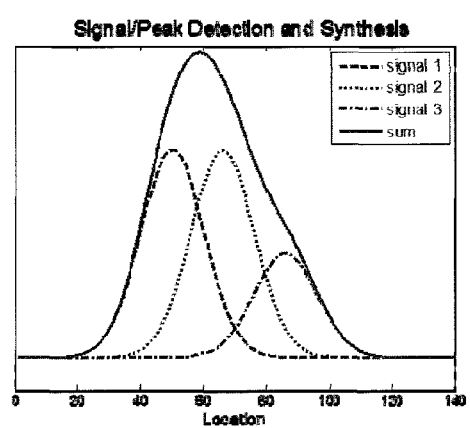

FIG. 8A shows the original trace signal data comprising 140 data points. FIG. 8B shows the reduced set of trial signals after two processing iterations of process 700 (specifically steps 730 to 750). FIG. 8C shows the reduced set of trial signals after eight processing iterations of process 700. As can be seen in FIG. 8C, the signals are beginning to converge to three groups. The negative amplitude values shown in FIG. 8C are de-emphasized in step 750 upon the next iteration. FIG. 8D shows the reduced set of trial signals after N (not N as in the number of trace data points, but rather a generic value N which in this case may be 11 or 12) processing iterations of process 700. As can be seen in FIG. 8D, three amplitude groups have emerged, where these three amplitude groups can be processed to determine characteristics of three constituent signals. FIG. 8E shows a visual representation of the three constituent signals and their determined characteristics (i.e., peak location, peak intensity and width (in this case the specified test sigma)) and also a visualization of the sum of the three constituent signals, which matches the original trace signal data shown in FIG. 8A.

Figure 9A:
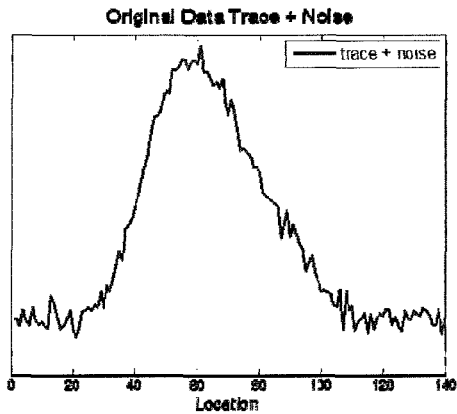
Figure 9B:
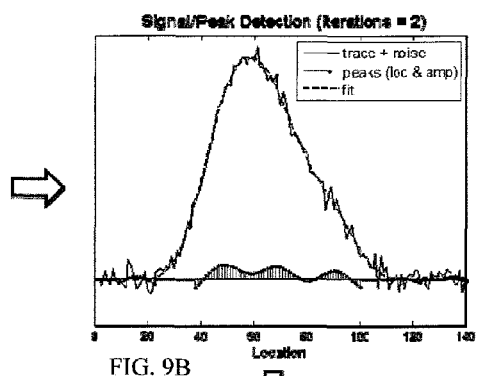
Figure 9C:
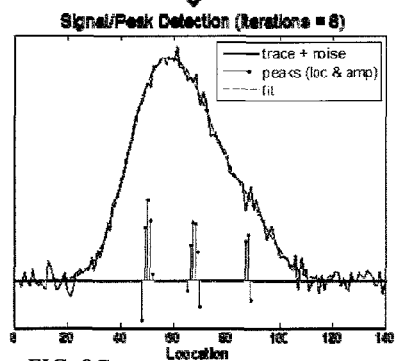
Figure 9E:
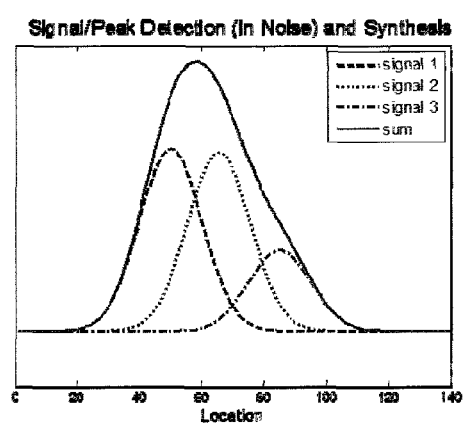
Figure 9D:
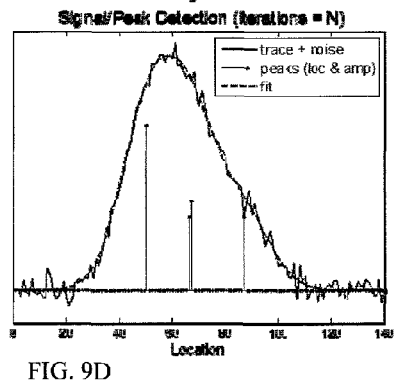

FIG. 9A shows the original trace signal data comprising 140 data points. The trace signal data in FIG. 9A is similar to that of FIG. 8A, but includes noise. FIG. 9B shows the reduced set of trial signals after two processing iterations of process 700 (specifically steps 730 to 750). FIG. 9C shows the reduced set of trial signals after eight processing iterations of process 700. As can be seen in FIG. 9C, the signals are beginning to converge to three groups. The negative amplitude values shown in FIG. 9C are de-emphasized in step 750 upon the next iteration. FIG. 9D shows the reduced set of trial signals after N (not N as in the number of trace data points, but rather a generic value N which in this case may be 11 or 12) processing iterations of process 700. As can be seen in FIG. 9D, three amplitude groups have emerged, where these three amplitude groups can be processed to determine characteristics of three constituent signals. FIG. 9E shows a visual representation of the three constituent signals and their determined characteristics (i.e., peak location, peak intensity and width (in this case the specified test sigma)) and also a visualization of the sum of the three constituent signals, which substantially matches the original trace signal data shown in FIG. 9A, but without the noise which has effectively been filtered out.

In some instances, it is desirable to determine an optimal width of the constituent signals determined in phase I. Phase II of the method, in conjunction with Phase I, determines the optimal signal width (sigma) and the associated number of signals, locations, and amplitudes of each of the signals (which are assumed to be Gaussian) contained within the input trace data. In one embodiment, a set of trial (test) signal widths are processed individually in Phase I (method 700) and are evaluated together as a set to determine the optimal signal sigma (and the associated number of signals, locations, and amplitudes). For example, in one embodiment, a plurality of test signal width values are defined and phase I process 700 is repeated for each of the plurality of test signal width values and the results of each phase I output are evaluated together to determine an optimal signal width for each of the one or more signal components of the trace signal. The test signal width values may be defined automatically based on characteristics of the device or system that generated the trace signal data, or set by a user (e.g., by inputting specific test sigma values, or a range of values, or selecting from a list of possible values or range of values).

A specific example of a methodology for phase II, implemented in a matrix formulation, for determining one or more unknown signal components of trace signal data will now be described with reference to FIG. 10. FIG. 10 is a flow diagram of a matrix formulation of a signal width (sigma) determination method 1000 according to an embodiment. In method 1000, the exemplary Gaussian model shown in FIG. 7 is updated to include multiple signal widths as follows:

$$\text{Gaussian Model: } G_{(i,j,k)} = A_{(i,k)} E_{(i,j,k)} \tag{13}$$

$$E_{(i,j,k)} = e^{\frac{-[(x_j - \mu_i)/\sigma_k]^2}{2}} \tag{14}$$

where $x_j$=trace data point locations
$y_j$=trace data point intensity values
$\mu_i$=signal peak (mean) locations
$A_{(i,k)}$=signal peak amplitude matrix
$\sigma_k$=signal test widths (sigmas)
i=1 to M (number of signals)
j=1 to N (number of data points)
k=1 to P (number of test signal widths (sigmas))

In step 1010, the trace signal data is received and a plurality (e.g., two or more) test signal widths are received. The test signal widths (test sigma ($\sigma_k$)) may be received from a user input, or may be automatically generated by the system. In step 1020, the phase I method 700 is performed for each test sigma ($\sigma_k$) resulting in a set of amplitudes ($A_{(i,k)}$) for each data point location ($x_j$) and sigma ($\sigma_k$). In phase I method 700 the number of initial peaks (M) is equal to the number of data points (N) and the initial signal peak locations ($\mu_i$) are set equal to the trace data point locations ($x_j$).

In step 1030, the amplitude outputs ($A_{(i,k)}$) from the multi-phase I analysis, step 1020, are synthesized into a set of fit traces. In one embodiment, the fit traces are synthesized as follows:

$$yFit_{(j,k)} = \sum_{i=1}^{N} A_{(i,k)} E_{(i,j,k)} \tag{15}$$

In step 1040, a region (r) along the trace data location axis ($x_j$) is selected where there is activity (e.g., amplitudes>0) and where the signal widths are deemed to be stable (e.g., not varying by more than a defined threshold percentage). For this example the region will be defined as equivalent to the trace data locations ($r_j = x_j$).

In step 1050, trace fit quality metrics are determined. For example, in one embodiment, a trace percent fit error is calculated for each test sigma ($\sigma_k$) as follows:

$$PE_k = \frac{100 \sum_{j=1}^{N} |y_j - yFit_{(j,k)}|}{\sum_{j=1}^{N} y_j} \tag{16}$$

where a perfect match occurs when ($PE_k = 0$), and a trace fit peak count ratio is calculated for each test sigma ($\sigma_k$) as follows:

$$PC_k = \frac{\text{number of amplitudes } (A_{(i,k)}) > 0 \text{ for each } \sigma_k}{N} \tag{17}$$

In step 1060, an optimal sigma fit factor is calculated, for example, by normalizing equations (16) and (17), and summing them accordingly:

$$SF_k = \frac{PE_k - \min(PE_k)}{\max(PE_k) - \min(PE_k)} + \frac{PC_k - \min(PC_k)}{\max(PC_k) - \min(PC)_k} \tag{18}$$

Locating the minimum of $SF_k$ provides an indication of the optimal signal width (sigma) for that trace data region. If other data regions have not been processed, the method proceeds to step 1040 for the additional data region(s).

In step 1070, detected signal characteristics (e.g., peak locations and intensities from phase I and peak widths from phase II) are output. Step 1070 may be performed after each data region (r) has been processed or after all data regions have been processed. The number of signals (groups of consecutive amplitudes with intensities greater than zero), locations (centroid location of each amplitude group), and intensities (amplitude group sum) has been established. These determined signal characteristics can then be synthesized to describe the signal content of the input trace signal data.

FIGS. 11 and 15 provide examples illustrating the processing (fit error) results for three test signal widths (sigmas), without and with noise, respectively, in the phase II method 1000 for which the true sigma width is 10.

FIGS. 11-14 illustrate example phase II results for trace signal data without noise. FIG. 11 illustrates (fit error or $PE_k$) results for three test signal widths (sigmas) for trace signal data without noise, where the true signal width (sigma) is 10. FIG. 11A shows results for a test sigma of 6 with a fit error of 0, FIG. 11B shows results for a test sigma of 10 a fit error of 0, and FIG. 11C shows results for a test sigma of 14 a fit error of 5.04. FIG. 12 illustrates a graph of fit error (or $PE_k$) v. test sigma from trace data containing Gaussian signals for a range of test sigmas (5 to 15). As can be seen, the slope of the curve deviates where the test signal width (sigma) equals the true signal width (sigma), in this example 10. FIG. 13 illustrates a graph of peak count ratio (or $PC_k$) v. test sigma from trace data containing Gaussian signals for a range of test sigmas (5 to 15). As can be seen, the slope of the curve deviates where the test signal width (sigma) equals the true signal width (sigma), in this example 10. FIG. 14 illustrates a graph of calculated sigma fit factor (or $SF_k$) v. test sigma from trace data containing Gaussian signals for a range of test sigmas (5 to 15). As can be seen, the vertex (dip) in the curve occurs where the test signal width (sigma) equals the true signal width (sigma), in this example 10.

FIGS. 15-18 illustrate example phase II results for trace signal data in the presence of noise. FIG. 15 illustrates (fit error or $PE_k$) results for three test signal widths (sigmas) for trace signal data in the presence of noise, where the true signal width (sigma) is 10. FIG. 15A shows results for a test sigma of 6 with a fit error of 6.23, FIG. 15B shows results for a test sigma of 10 a fit error of 6.31, and FIG. 15C shows results for a test sigma of 14 a fit error of 8.44. FIG. 16 illustrates a graph of fit error (or $PE_k$) v. test sigma from trace data containing Gaussian signals for a range of test sigmas (5 to 15). As can be seen, the slope of the curve deviates where the test signal width (sigma) equals the true signal width (sigma), in this example 10. FIG. 17 illustrates a graph of peak count ratio (or $PC_k$) v. test sigma from trace data containing Gaussian signals for a range of test sigmas (5 to 15). As can be seen, the slope of the curve deviates where the test signal width (sigma) equals the true signal width (sigma), in this example 10. FIG. 18 illustrates a graph of calculated sigma fit factor (or $SF_k$) v. test sigma from trace data containing Gaussian signals for a range of test sigmas (5 to 15). As can be seen, the vertex (dip) in the curve occurs where the test signal width (sigma) equals the true signal width (sigma), in this example 10.

FIG. 19 is a block diagram of example functional components for a computing system or device 1902 configured to perform one or more of the analysis techniques described herein, according to an embodiment. For example, the computing device 1902 may be configured to analyze an input data stream (trace signal data) and to determine one or more (unknown) constituent signals in the input data stream. One particular example of computing device 1902 is illustrated. Many other embodiments of the computing device 1902 may be used. In the illustrated embodiment of FIG. 19, the computing device 1902 includes one or more processor(s) 1911, memory 1912, a network interface 1913, one or more storage devices 1914, a power source 1915, output device(s) 1960, and input device(s) 1980. The computing device 1902 also includes an operating system 1918 and a communications client 1940 that are executable by the computing device 1902. Each of components 1911, 1912, 1913, 1914, 1915, 1960, 1980, 1918, and 1940 is interconnected physically, communicatively, and/or operatively for inter-component communications in any operative manner.

As illustrated, processor(s) 1911 are configured to implement functionality and/or process instructions for execution within computing device 1902. For example, processor(s) 1911 execute instructions stored in memory 1912 or instructions stored on storage devices 1914. The processor may be implemented as an ASIC including an integrated instruction set. Memory 1912, which may be a non-transient computer-readable storage medium, is configured to store information within computing device 1902 during operation. In some embodiments, memory 1912 includes a temporary memory, area for information not to be maintained when the computing device 1902 is turned OFF. Examples of such temporary memory include volatile memories such as random access memories (RAM), dynamic random access memories (DRAM), and static random access memories (SRAM). Memory 1912 maintains program instructions for execution by the processor(s) 1911. Example programs can include the signal detection and characterization engine 104 and/or the trace data synthesis engine 106 in FIG. 1.

Storage devices 1914 also include one or more non-transient computer-readable storage media. Storage devices 1914 are generally configured to store larger amounts of information than memory 1912. Storage devices 1914 may further be configured for long-term storage of information. In some examples, storage devices 1914 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The computing device 1902 uses network interface 1913 to communicate with external devices via one or more networks. Network interface 1913 may be a network interface card, such as an Ethernet card, an optical transceiver, a radio frequency transceiver, or any other type of device that can send and receive information. Other non-limiting examples of network interfaces include wireless network interface, Bluetooth®, 9G and WiFi® radios in mobile computing devices, and USB (Universal Serial Bus). In some embodiments, the computing device 1902 uses network interface 1913 to wirelessly communicate with an external device or other networked computing device.

The computing device 1902 includes one or more separate or integrated input devices 1980. Some input devices 1980 are configured to sense the environment and capture images or other signals. Some input devices 1980 are configured to receive input from a user through tactile, audio, video, or other sensing feedback. Non-limiting examples of input devices 1980 include a presence-sensitive screen, a mouse, a keyboard, a voice responsive system, camera 1902, a video recorder 1904, a microphone 1906, a GPS module 1908, or any other type of device for detecting a command from a user or for sensing the environment. In some examples, a presence-sensitive screen includes a touch-sensitive screen.

One or more output devices 1960 are also included in computing device 1902. Output devices 1960 are configured to provide output to another system or device or to a user using tactile, audio, and/or video stimuli. Output devices 1960 may include a display screen (e.g., a separate screen or part of the presence-sensitive screen), a sound card, a video graphics adapter card, or any other type of device for converting a signal into an appropriate form understandable to humans or machines. Additional examples of output device 1960 include a speaker, a cathode ray tube (CRT) monitor, a liquid crystal display (LCD), or any other type of device that can generate intelligible output to a user. In some embodiments, a device may act as both an input device and an output device.

The computing device 1902 includes one or more power sources 1915 to provide power to the computing device 1902. Non-limiting examples of power source 1915 include single-use power sources, rechargeable power sources, and/or power sources developed from nickel-cadmium, lithium-ion, or other suitable material.

The computing device 1902 includes an operating system 1918. The operating system 1918 controls operations of the components of the computing device 1902. For example, the operating system 1918 facilitates the interaction of communications client 1940 with processors 1911, memory 1912, network interface 1913, storage device(s) 1914, input device 1980, output device 1960, and power source 1915.

As also illustrated in FIG. 19, the computing device 1902 includes communications client 1940. Communications client 1940 includes communications module 1945. Each of communications client 1940 and communications module 1945 includes program instructions and/or data that are executable by the computing device 1902. For example, in one embodiment, communications module 1945 includes instructions causing the communications client 1940 executing on the computing device 1902 to perform one or more of the operations and actions described in the present disclosure. In some embodiments, communications client 1940 and/or communications module 1945 form a part of operating system 1918 executing on the computing device 1902.

According to various embodiments, one or more of the components shown in FIG. 19 may be omitted from the computing device 1902.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Certain embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A processor-implemented method of processing a trace signal to determine one or more unknown signal components of the trace signal, the method comprising:
  receiving trace signal data, the trace signal data including a plurality N of data points and representing at least M signals within a bandwidth defining the trace data, wherein M is an integer greater than or equal to 1;
  defining an initial set of signal components to be the number N of data points, wherein initial signal locations for each of the signal components of the initial set of signal components correspond to the locations within the bandwidth of the number N of data points;
  a) simultaneously performing a numerical method signal extraction calculation on each signal component in the initial set of signal components;
  b) determining a signal amplitude value for each signal component of the initial set of signal components based on the extraction calculation;
  c) removing from the initial set of signal components, or attenuating, each signal component determined to have a negative signal amplitude value based on the extraction calculation to produce an adjusted set of signal components;
  d) determining a final set of signal components by iteratively repeating steps a)-c) using the adjusted set of signal components as the initial set of signal components until no signal component has a negative amplitude value based on the extraction calculation; and thereafter
  outputting signal locations and signal intensities of one or more signal components of the trace signal based on the final set of signal components,
  wherein outputting signal locations and signal intensities of the one or more signal components of the trace signal based on the final set of signal components includes:
  identifying one or more amplitude groups in the final set of signal components, each amplitude group comprising signal components corresponding to one or more consecutive locations each having a non-zero, positive amplitude value,
  determining a signal location for each of the one or more signal components of the trace signal by calculating a centroid of the corresponding amplitude group; and
  determining a signal intensity for each of the one or more signal components of the trace signal by summing the amplitude values of the signal components within the corresponding amplitude group.

2. The method of claim 1, wherein the numerical method extraction calculation includes a conjugate gradient method, a Generalized Minimum Residual method, a Newton's method, a Broyden's method or a Gaussian elimination method.

3. The method of claim 1, wherein all signal components in the trace data are assumed to have the same curve profile type when performing the numerical method signal extraction calculation, wherein the curve profile type is selected from the group consisting of a Gaussian profile, a bi-Gaussian profile, an exponentially modified Gaussian profile, a Haarhoff-van der Linde profile, a Lorentzian profile and a Voigt profile.

4. The method of claim 1, wherein the trace signal data includes noise.

5. The method of claim 1, wherein the numerical method signal extraction calculation is performed using a matrix formulation, wherein determining a signal amplitude value includes identifying indices of an amplitude matrix that have negative amplitudes, and wherein removing or attenuating includes updating a weighting matrix so that weight values of the corresponding identified indices in the weighting matrix are each multiplied by an attenuation factor, wherein the attenuation factor is less than 1 and greater than or equal to zero.

6. The method of claim 5, wherein the attenuation factor varies for each iteration of step a) through c).

7. The method of claim 1, further comprising
  defining a plurality of test signal width values;
  iteratively repeating steps a)-d) for each of said plurality of test signal width values to determine an optimal signal width for each of the one or more signal components of the trace signal, and
  wherein outputting includes outputting the optimal signal width of the one or more signal components of the trace signal.

8. The method of claim 1, wherein outputting signal locations and signal intensities of the one or more signal components of the trace signal based on the final set of signal components includes rendering a visual output of the one or more signal components of the trace signal with a visual representation of the trace signal data.

9. A non-transitory computer readable medium storing code, which when executed by one or more processors cause the one or more processors to implement a method of processing a trace signal to determine one or more unknown signal components of the trace signal, the code including instructions to:
  receive trace signal data, the trace signal data including a plurality N of data points and representing at least M signals within a bandwidth defining the trace data, wherein M is an integer greater than or equal to 1;
  define an initial set of signal components to be the number N of data points, wherein initial signal locations for each of the signal components of the initial set of signal components correspond to the locations within the bandwidth of the number N of data points;
  a) simultaneously perform a numerical method signal extraction calculation on each signal component in the initial set of signal components;
  b) determine a signal amplitude value for each signal component of the initial set of signal components based on the extraction calculation;
  c) remove from the initial set of signal components, or attenuating, each signal component determined to have a negative signal amplitude value based on the extraction calculation to produce an adjusted set of signal components;
  d) determine a final set of signal components by iteratively repeating a)-c) using the adjusted set of signal components as the initial set of signal components until no signal component has a negative amplitude value based on the extraction calculation; and thereafter
  output signal locations and signal intensities of one or more signal components of the trace signal based on the final set of signal components,
  wherein the instructions to output signal locations and signal intensities of the overlapping signal components based on the final set of signal components include instructions to:

identify one or more amplitude groups in the final set of signal components, each amplitude group comprising signal components corresponding to one or more consecutive locations each having a non-zero, positive amplitude value, determine a signal location for each of the one or more signal components of the trace signal by calculating a centroid of the corresponding amplitude group; and determine a signal intensity for each of the one or more signal components of the trace signal by summing the amplitude values of the signal components within the corresponding amplitude group.

10. The computer readable medium of claim 9, wherein the numerical method extraction calculation includes a conjugate gradient method, a Generalized Minimum Residual method, a Newton's method, a Broyden's method or a Gaussian elimination method.

11. The computer readable medium of claim 9, wherein all signal components in the trace data are assumed to have the same curve profile type when performing the numerical method signal extraction calculation, wherein the curve profile type is selected from the group consisting of a Gaussian profile, a bi-Gaussian profile, an exponentially modified Gaussian profile, a Haarhoff-van der Linde profile, a Lorentzian profile and a Voigt profile.

12. The computer readable medium of claim 9, wherein the trace signal data includes noise.

13. The computer readable medium of claim 9, wherein the numerical method signal extraction calculation is performed using a matrix formulation, wherein the instructions to determine a signal amplitude value includes instructions to identify indices of an amplitude matrix that have negative amplitudes, and wherein the instructions to remove or attenuate includes instructions to update a weighting matrix so that weight values of the corresponding identified indices in the weighting matrix are each multiplied by an attenuation factor, wherein the attenuation factor is less than 1 and greater than or equal to zero.

14. The computer readable medium of claim 13, wherein the attenuation factor varies for each iteration of a) through c).

15. The computer readable medium of claim 9, wherein the code further comprises instructions to define a plurality of test signal width values;

iteratively repeat a)-d) for each of said plurality of test signal width values to determine an optimal signal width for each of the one or more signal components of the trace signal, and wherein the instructions to output includes instructions to output the optimal signal width of the one or more signal components of the trace signal.

16. The computer readable medium of claim 9, wherein the instructions to output signal locations and signal intensities of the one or more signal components of the trace signal based on the final set of signal components include instructions to render a visual output of the one or more signal components of the trace signal with a visual representation of the trace signal data.

17. A processing device that processes a trace signal to determine one or more unknown signal components of the trace signal, the device comprising:

a processor; and a memory storing code executable by the processor;

wherein the code includes instructions, which when executed by the processor, cause the processor to:

receive trace signal data, the trace signal data including a plurality N of data points and representing at least M signals within a bandwidth defining the trace data, wherein M is an integer greater than or equal to 1;

define an initial set of signal components to be the number N of data points, wherein initial signal locations for each of the signal components of the initial set of signal components correspond to the locations within the bandwidth of the number N of data points;

a) simultaneously perform a numerical method signal extraction calculation on each signal component in the initial set of signal components;

b) determine a signal amplitude value for each signal component of the initial set of signal components based on the extraction calculation;

c) remove from the initial set of signal components, or attenuating, each signal component determined to have a negative signal amplitude value based on the extraction calculation to produce an adjusted set of signal components;

d) determine a final set of signal components by iteratively repeating a)-c) using the adjusted set of signal components as the initial set of signal components until no signal component has a negative amplitude value based on the extraction calculation; and thereafter output signal locations and signal intensities of one or more signal components of the trace signal based on the final set of signal components, wherein the instructions to output signal locations and signal intensities of the one or more signal components of the trace signal based on the final set of signal components include instructions to:

identify one or more amplitude groups in the final set of signal components, each amplitude group comprising signal components corresponding to one or more consecutive locations each having a non-zero, positive amplitude value, determine a signal location for each of the one or more signal components of the trace signal by calculating a centroid of the corresponding amplitude group; and determine a signal intensity for each of the one or more signal components of the trace signal by summing the amplitude values of the signal components within the corresponding amplitude group.

18. The device of claim 17, wherein the numerical method extraction calculation includes a conjugate gradient method, a Generalized Minimum Residual method, a Newton's method, a Broyden's method or a Gaussian elimination method.

19. The device of claim 17, wherein all signal components in the trace data are assumed to have the same curve profile type when performing a numerical method signal extraction calculation, wherein the curve profile type is selected from the group consisting of a Gaussian profile, a bi-Gaussian profile, an exponentially modified Gaussian profile, a Haarhoff-van der Linde profile, a Lorentzian profile and a Voigt profile.

20. The device of claim 17, wherein the trace signal data includes noise.

21. The device of claim 17, wherein the numerical method signal extraction calculation is performed using a matrix formulation, wherein the instructions to determine a signal amplitude value includes instructions to identify indices of an amplitude matrix that have negative amplitudes, and wherein the instructions to remove or attenuate includes instructions to update a weighting matrix so that weight values of the corresponding identified indices in the weighting matrix are each multiplied by an attenuation factor, wherein the attenuation factor is less than 1 and greater than or equal to zero.

22. The device of claim 21, wherein the attenuation factor varies for each iteration of a) through c).

23. The device of claim 17, wherein the code further comprises instructions to
- define a plurality of test signal width values;
- iteratively repeat a)-d) for each of said plurality of test signal width values to determine an optimal signal width for each of the one or more signal components of the trace signal, and
- wherein the instructions to output includes instructions to output the optimal signal width of the one or more signal components of the trace signal.

24. The device of claim 17, wherein the instructions to output signal locations and signal intensities of the one or more signal components of the trace signal based on the final set of signal components include instructions to render a visual output of the one or more signal components of the trace signal with a visual representation of the trace signal data.

\* \* \* \* \*

UNITED STATES PATENT AND TRADEMARK OFFICE
CERTIFICATE OF CORRECTION

PATENT NO. : 9,971,936 B2
APPLICATION NO. : 15/185983
DATED : May 15, 2018
INVENTOR(S) : Patrick G. Humphrey Page 1 of 1

It is certified that error appears in the above-identified patent and that said Letters Patent is hereby corrected as shown below:

In the Specification

Column 1, Line 7 (approx.), under the heading titled, "Federally Sponsored Research or Development," please delete the first sentence:
"This invention was made with Government support under Grant Number 1R43GM112289-01 awarded by the Department of Health and Human Services."

Please add the first sentence:
--This invention was made with Government support under Grant Number 1R43GM112289-01 awarded by the National Institutes of Health.--

Signed and Sealed this
Fourth Day of June, 2019

Andrei Iancu
*Director of the United States Patent and Trademark Office*